(12) United States Patent
Samimy et al.

(10) Patent No.: US 7,334,394 B2
(45) Date of Patent: Feb. 26, 2008

(54) LOCALIZED ARC FILAMENT PLASMA ACTUATORS FOR NOISE MITIGATION AND MIXING ENHANCEMENT

(75) Inventors: Mohammad Samimy, Worthington, OH (US); Igor Adamovich, Powell, OH (US)

(73) Assignee: The Ohio State University, Columbus, OH (US)

( * ) Notice: Subject to any disclaimer, the term of this patent is extended or adjusted under 35 U.S.C. 154(b) by 449 days.

(21) Appl. No.: 10/932,325

(22) Filed: Sep. 1, 2004

(65) Prior Publication Data

US 2006/0005545 A1    Jan. 12, 2006

Related U.S. Application Data

(60) Provisional application No. 60/499,505, filed on Sep. 2, 2003.

(51) Int. Cl.
*F02K 1/46*    (2006.01)
*F01D 25/30*   (2006.01)

(52) U.S. Cl. .................. 60/226.1; 60/770; 239/265.19

(58) Field of Classification Search .............. 60/226.1, 60/770, 771, 230, 266; 239/265.19
See application file for complete search history.

(56) References Cited

U.S. PATENT DOCUMENTS

| | | | | |
|---|---|---|---|---|
| 2,279,586 A | * | 4/1942 | Bennett | 315/111.91 |
| 2,354,151 A | * | 7/1944 | Skoglund | 239/127.3 |
| 2,763,125 A | | 9/1956 | Kadosch et al. | |
| 3,122,883 A | * | 3/1964 | Terner | 428/34.6 |
| 3,143,851 A | * | 8/1964 | Nyman | 60/202 |
| 3,371,491 A | | 3/1968 | Pinter | |
| 4,934,481 A | | 6/1990 | Friedrich | |
| 5,387,842 A | | 2/1995 | Roth et al. | |
| 5,414,324 A | | 5/1995 | Roth et al. | |
| 5,669,583 A | | 9/1997 | Roth | |
| 5,752,381 A | * | 5/1998 | Speller | 60/230 |
| 5,964,433 A | * | 10/1999 | Nosenchuck | 244/205 |
| 5,966,452 A | | 10/1999 | Norris | |

(Continued)

FOREIGN PATENT DOCUMENTS

WO     WO 03/025377 A    3/2003

OTHER PUBLICATIONS

Leger, L. et al: "Influence of DC corona discharge on the airflow along an inclined flat plate", Journal of Electrostatics, Elsevier Science Publishers B.V., Amsterdam, NL, vol. 51-52, May 2001, pp. 300-306.

(Continued)

*Primary Examiner*—Ted Kim
(74) *Attorney, Agent, or Firm*—Dinsmore & Shohl LLP

(57) ABSTRACT

A device for controlling fluid flow. The device includes an arc generator coupled to electrodes. The electrodes are placed adjacent a fluid flowpath such that upon being energized by the arc generator, an arc filament plasma adjacent the electrodes is formed. In turn, this plasma forms a localized high temperature, high pressure perturbation in the adjacent fluid flowpath. The perturbations can be arranged to produce vortices, such as streamwise vortices, in the flowing fluid to control mixing and noise in such flows. The electrodes can further be arranged within a conduit configured to contain the flowing fluid such that when energized in a particular frequency and sequence, can excite flow instabilities in the flowing fluid. The placement of the electrodes is such that they are unobtrusive relative to the fluid flowpath being controlled.

21 Claims, 7 Drawing Sheets

U.S. PATENT DOCUMENTS

| | | |
|---|---|---|
| 6,247,671 B1 | 6/2001 | Saeks et al. |
| 2004/0118973 A1 | 6/2004 | Malmuth et al. |

OTHER PUBLICATIONS

Thomas C. Corke and Eric Matlis; Phased Plasma Arrays For Unsteady Flow Control; AIAA paper 2000-2323; Fluids 2000 Conference; Jun. 19-22, 2000; AIAA; Reston, VA.

R.G. Adelgren, G.S. Elliott, J.B. Crawford, C.D. Carter, D. Grosjean and J.M. Donbar; Axisymmetric Jet Shear Layer Excitation Induced by Electric Arc Discharge and Focused Laser Energy Deposition; AIAA paper 2002-0729; AIAA Aerospace Sciences Meeting & Exhibit; 14-.

Sergey Leonov, Valentin Bityurin, Konstantin Savelkin, Dmitry Yarantsev; The Features of Electro-Discharge Plasma Control of High-Speed Gas Flows; AIAA paper 2000-2323; AIAA Plasmadynamics and Lasers Conference; Jun. 19-22, 2000; AIAA; Restin, VA.

\* cited by examiner

LOCALIZED ARC FILAMENT PLASMA ACTUATORS FOR NOISE MITIGATION AND MIXING ENHANCEMENT

This application claims the benefit of the filing date of U.S. Provisional Application No. 60/499,505, filed Sep. 2, 2003.

STATEMENT REGARDING FEDERALLY SPONSORED RESEARCH OR DEVELOPMENT

This invention was made with Government support under NAS3-02116 awarded by NASA. The government has certain rights in the invention.

BACKGROUND OF THE INVENTION

The present invention relates to the control of high-velocity fluid streams, such as those present in core and fan streams exhausting a gas turbine engine, and more particularly to the manipulation of such fluid streams through localized arc filament plasmas to affect noise radiation from and mixing rate in the mixing layers of these streams.

Noise radiation from an aircraft gas turbine engine is the dominant component of noise during takeoff and a major component during landing. As such, it is becoming an important issue for both commercial and military aircraft that are operating at considerably closer proximity to population centers, as there is mounting pressure to reduce noise propagated to adjacent communities. Commercial subsonic aircraft engine manufacturers have been able to satisfy increasingly stringent environmental noise regulations by using larger by-pass ratio engines. Unfortunately, the sheer physical size of current commercial subsonic aircraft engines is such that even larger bypass ratio engines are not practical. Additionally, in future supersonic commercial aircraft and also in high-performance military aircraft, large bypass ratio engines are not a viable option because of the performance penalties that such a design would incur.

It has been known for quite some time that large-scale coherent structures in jets are responsible for the entrainment and mixing of exhaust systems, and that their dynamical processes are responsible for a major portion of far field noise radiation. Research has indicated that these large-scale spanwise coherent structures in two-dimensional or ring-like coherent structures in axisymmetric jets or mixing layers, become more three-dimensional and less coherent as the compressibility level (which is generally proportional the ratio of velocity difference across the mixing layer to the average speed of sound in the two streams) is increased. This phenomenon renders these structures less amenable to control strategies similar to those traditionally used in incompressible and low Reynolds number flows. In contrast to these large-scale structures, longitudinal (streamwise) large-scale vortices do not seem to be much affected by compressibility. Thus, the use of streamwise vortices appears to be a logical approach in controlling mixing and consequently controlling the far field acoustic radiation in highly compressible jets.

In the past, several techniques have been explored in generating streamwise vortices. For example, small tabs or chevrons attached to the nozzle exit and used as streamwise vortex generators were found to be an effective device in enhancing mixing and altering noise characteristics in both incompressible and compressible jets, due to the presence of a spanwise pressure gradient set up in front of a tab, which since it protrudes into the flow, generates a spanwise pressure gradient regardless of whether the flow is subsonic or supersonic. In addition to streamwise vortices generated due to the spanwise pressure gradient, the streamwise pressure gradient generated by a tab promotes the development of robust spanwise vortices. Although the use of tabs and related protrusions to enhance mixing is effective in both incompressible and compressible flows, such use results in thrust losses due to the blockage effects. Gentler tabs, such as chevrons, can be used to reduce this thrust loss; however, their smaller profile necessitates weaker streamwise vortices and thus less mixing enhancement or noise alteration. Moreover, it is also beneficial to minimize the performance penalties associated with flowstream protrusions by having them deploy only during certain operational conditions (for example, during takeoff and landing in aircraft applications). Such an on-demand system requires complex tabs/chevrons geometries, ancillary actuation hardware and controllers, thereby exacerbating system complexity, weight and cost.

An alternative technique for generating streamwise vortices is the use of simple nozzle trailing edge modifications or cutouts. These cutouts are similar to chevrons, except that they do not protrude into the flow. Prior research has shown that such modifications have been effective in producing streamwise vortices that in turn generate enhanced mixing in incompressible axisymmetric jets, although the effectiveness of trailing edge modifications heavily depend on the flow regime. It was found that the use of trailing edge modifications enhanced mixing significantly in the underexpanded cases and moderately in the overexpanded cases. It was also found that the trailing edge modified nozzles substantially reduced the broadband shock associated noise radiation for both the underexpanded and overexpanded flow regimes, but did not significantly alter the noise field for the ideally expanded flow condition. While it is believed that the mechanism employed by nozzle trailing edge modifications to produce streamwise vortices is still a spanwise pressure gradient, it appears that such effects are relatively small in subsonic jets and heavily flow regime-dependent in supersonic jets. There is also evidence that trailing edge modifications exhibit a strong effect on the rate of jet mixing and thus noise radiation.

Another technique involves the use of fluidics, where pressurized fluid (typically air) is introduced into the flow-path to force an instability therein. Fluidic injection has not been entirely successful for use in high-speed flows for two main reasons. First, instability frequencies in high-speed flows are quite high, which necessitates that any actuation mechanism must possess high bandwidth capability. Second, fluid flows with high Reynolds numbers (such as those found in high subsonic and supersonic flow velocities) possess large dynamic loading within a noisy environment, which require high amplitude forcing. The lack of the availability of actuators with high bandwidth and high amplitude has been one of the main obstacles in fluidic control of high-speed flows. Efforts have been made to force shear layers in high Reynolds number at the jet column frequency; however, the required forcing amplitude is much higher than that used traditionally. Similarly, efforts have been made to develop high bandwidth and amplitude fluidic actuators. The main drawback of such fluidic actuators is the difficulty of establishing a reference time (or phase), for without such a reference time, the actuators cannot be used to force various azimuthal modes in axisymmetric jets. Since it is believed that certain of these azimuthal modes are instrumental in achieving noise reduction, the presence of an actuator that can excite such instabilities is highly desirable.

Still another technique that has been used in recent years exploits electric discharge plasmas for flow control. In a typical plasma-based approach, intense, localized and rapid heating is produced in the high-current pulsed electric discharges and pulsed optical discharges. This rapid near-adiabatic heating results in an abrupt pressure jump in the vicinity of the current-carrying filament. These pressure jumps in turn produce shock waves in supersonic flows, which can considerably modify the supersonic flow over blunt bodies and in supersonic inlets. Therefore, the rapidly heated regions act similar to physical geometry alterations (such as the tabs and trailing edge cutouts discussed earlier) in the flow but do so for short time durations. Various methods of plasma generation, including direct current (DC), alternating current (AC), radio frequency (RF), microwave, arc, corona, and spark electric discharges, as well as laser-induced breakdown, have been used to initiate plasma-based fields for flow control.

Previous investigations into plasma-based flow control have mainly focused on viscous drag reduction and control of boundary layer separation in low-speed flows, as well as shock wave modification and wave drag reduction in supersonic and hypersonic flows. In the previous high-speed research, spatially distributed heating induced by AC or RF glow discharges has been used to produce weak disturbances in the supersonic shear layer or to weaken the oblique shock in the supersonic inviscid core flow. These experiments have been conducted at fairly low static pressures, for example, at stagnation pressures of between 0.3 and 1.0 atmosphere with Mach numbers between two and four. This allowed initiating and sustaining diffuse glow discharges, which weakly affected relatively large areas of the flow. The main mechanism of the plasma flow control in these previous studies is heating of the flow by the plasma. In low-speed flows, the dominant plasma flow control mechanism is flow entrainment due to momentum transfer from high-speed directed motion of ions (i.e. electrical current) to neutral species (i.e. bulk flow) in the presence of a strong electric field. At these conditions, the ion velocity can be very high (for example, approximately 1000 meters per second for typical electric fields of 10 kilovolts per centimeter at one atmosphere). Although this approach was demonstrated to significantly vary the skin friction coefficient and to control the boundary layer separation in low-speed flows (at flow velocities up to a few meters per second), its applicability to high-speed flows is unlikely. The main disadvantage of this technique is that the ion number density in non-equilibrium plasmas is very low (for example, typical ionization fractions $n_i/N$ are between approximately $10^{-8}$ and $10^{-6}$), which limits the momentum transfer to the neutral species flow; such limited momentum transfer is not conducive for high flow velocities. Another disadvantage of this approach is the high power consumption of non-equilibrium plasmas (typically between approximately 10 to 100 watts per cubic centimeter), due to the fact that only a very small fraction of the total input power (often well below 1%) goes to direct momentum transfer from the charged species to the neutral species. The rest of the power (more than 90%) is spent on excitation of vibrational and electronic levels of molecules by electron impact, followed by flow heating during relaxation processes. This makes affecting large areas of the flow by such plasmas prohibitively expensive.

What is needed are actuators that can exploit streamwise vorticity generation, manipulation of jet instabilities, or a combination of the two techniques to facilitate noise reduction and flow mixing in high speed fluid flow environments. What is also needed are such actuators that can provide high amplitude, high bandwidth forcing while simultaneously being capable of withstanding harsh environments, such as those found in air-breathing turbomachinery and related power-generating equipment. What is additionally needed are actuators that do not interfere with fluid flow in the jet by protruding into the jet stream.

SUMMARY OF THE INVENTION

These needs are met by the present invention, where one or more localized arc filament plasma actuators (in the form of paired electrodes) include both high amplitude and high bandwidth without requiring the use of high-power pulsed lasers, focused microwave beams, or electrodes protruding into the flow. The present inventors have discovered that the use of repetitively pulsed high-energy discharges emanating from electrodes spatially distributed on a conduit surface can produce streamwise vortices of desired distribution and kind. As previously mentioned, flow perturbations can produce spanwise vortices where, due to the nature of jet flow, they are generated naturally by jet instabilities. Thus, while the inventors' intent focuses on the generation and use of streamwise vorticity, it will be appreciated by those skilled in the art that the production of spanwise vorticity could also have utility, and that the present invention could be adapted to enhance or weaken such spanwise vorticity, depending upon the application. The present invention can be configured to distribute electrodes and energize them with proper excitation frequencies in such a way as to influence shear layer instabilities.

The present inventors have discovered that the use of repetitively pulsed high-energy discharges can produce strong localized pressure perturbations in subsonic and supersonic flows, at static pressures of 1.0 atmosphere, with no fundamental limitations at higher or lower pressures. These localized pressure perturbations are hefty enough to effectively act like a physical obstacle (such as a flap, tab or the like) suddenly placed in the flowpath. In the present context, the term "localized" and its variants represent changes made in the area of the duct, conduit or related flowpath that is immediately adjacent the electrodes or related plasma-producing terminals. The proximity of the plasma to the solid surface (i.e., the nozzle wall) greatly improves plasma stability, reducing the chance of plasma being blown off by the incident high-speed gas (such as air or exhaust gas) flow. Repetitive pulsing of the discharge would enable control over these pressure perturbation obstacles by having an arc filament initiated in the flow generate rapid (on the time scale of down to a few microseconds) localized heating up to high temperatures, which produces a concomitant localized pressure rise in the flow near the electrodes. Consequently, when the arc filament is on, the electrode functions as the aforementioned physical obstacle, similar to a small tab inserted into the flow. Advantages associated with the present invention include: the ability of the electrodes to modify the flow field on-demand, thereby allowing the electrodes to be turned on and off to minimize power consumption and potential losses when actuation is not necessary; avoidance of changing the geometry of the flowpath; avoidance of using moving parts that can wear out; and the controlling of mixing and noise in the jet by either excitation of flow instabilities, generating streamwise vorticity of desired frequency and strength, or by a combination of the two techniques.

Regarding the excitation of flow instabilities (such as the aforementioned shear layer instabilities), the present inventors have determined that the electrodes of the present invention can excite axisymmetric and azimuthal instabilities in high-speed jets for noise mitigation and mixing control, as well as demonstrating that streamwise vortices can be generated in non-axisymmetric (for example, rectangular) exhaust nozzles in subsonic or supersonic flow conditions. While the present inventors have tested the technique in limited geometries and flow conditions, there is no physical limitation imposed on the technique in terms of Mach number or the nozzle geometry.

According to a first aspect of the invention, a fluid stream flow modification system is disclosed. The system includes a fluid stream conduit configured to receive flowing fluid from a fluid source, and an arc generator cooperative with the conduit such that upon system operation, an arc filament plasma is formed that produces a localized perturbation in a portion of the fluid stream. The arc generator includes numerous electrodes disposed adjacent the fluid stream. The arrangement of the electrodes is such that they do not substantially protrude into the fluid stream, thereby by avoiding unnecessary flow disturbances. This unobtrusive profile, coupled with the on-demand nature of the flow perturbations, results in overall improvements in the flow of fluid in the stream. The electrodes produce localized (rather than global) perturbation that generates streamwise vorticity in the localized portion of the fluid stream. As previously mentioned, spanwise vortices are generated naturally by jet instabilities, and the present invention can be configured to enhance or weaken these spanwise vortices as needed. In addition to the electrodes, the system includes an energy source that can impart enough energy to the electrodes such that an arc filament plasma capable of generating the localized perturbation is formed.

In one optional embodiment, the energy source is an electric current source capable of high voltage operation. In one form, the electrodes are placed substantially flush with the surface of the conduit adjacent the fluid stream. Thus, for example, where the conduit is a duct, the electrodes form a substantially flush fit with the inner duct wall. The electrodes can be configured as an array of one or more rows, where configurations employing a plurality of rows can be arranged such that each successive row is axially downstream in the conduit relative to its immediately preceding row. In another form, the electrodes can be disposed adjacent a trailing edge of the conduit, as well as about the conduit's periphery. In configurations where the conduit is a duct, both substantially axisymmetric and non-axisymmetric constructions are possible, where in the latter, the duct could be, among other shapes, rectangular. In the present context, the term "substantially" is utilized to represent the inherent degree of uncertainty that may be attributed to any quantitative comparison, value, measurement, or other representation. As such, it refers to an arrangement of elements or features that, while in theory would be expected to exhibit exact correspondence or behavior, may in practice embody something slightly less than exact. The term also represents the degree by which a quantitative representation may vary from a stated reference without resulting in a change in the basic function of the subject matter at issue.

In another option, a controller can be coupled to the generator such that the generation of the localized perturbations at the electrodes occurs at predetermined times. For example, the electrodes can be energized either simultaneously or at staggered time intervals. Such staggering can promote the excitation of a desired instability or related perturbation pattern. The resistance of the conduit to the excess heat generated by the arc filaments can be made enhanced by various approaches. In one, the conduit can be made from a refractory material, such as a ceramic or ceramic composite. In another, a coolant supply can be placed in heat exchange relationship with the conduit to avoid excessive temperatures.

A significant difference of the localized arc filament plasma electrodes of the present invention over plasma electrodes developed previously (such as surface glow discharge-based devices) is that the present electrodes are designed to generate localized, high-temperature arc filaments rather than large surface area, low-temperature, non-equilibrium plasmas. Applying high voltage of select frequency to the electrode would generate a periodic arc and corresponding Joule heat release, resulting in high-frequency excitation of the flow. In addition, using two or more properly phased electrodes at the same time would allow excitation of specific flow instabilities (for example, azimuthal modes) by varying both the excitation frequency and the phase shift between individual electrodes. This effect, together with the small size of the filaments would make it possible to produce significant changes in the flow without a concomitant level of power consumption. Thus, two of the electrodes can be configured to cooperate with each other to define an actuator that produces the arc filament that in turn produces the localized perturbation. In a similar way, two (or more) electrodes could each be coupled to a ground electrode to define the actuator.

According to another aspect of the invention, an exhaust system is disclosed. The system includes an exhaust duct defining an exhaust stream flowpath surface, and an arc generator cooperative with the exhaust duct. Activation of the arc generator during the flow of the exhaust stream causes an arc filament plasma to be formed, which in turn produces a localized perturbation in a portion of the exhaust stream that is adjacent the arc filament formed around the electrodes. The arc generator is made up of a plurality of electrodes disposed adjacent the portion of the exhaust stream. As before, the electrodes do not substantially protrude into a flowpath defined by the exhaust stream. The electrodes are arranged such that when energized, the localized perturbation generates streamwise vorticity in the portion of the exhaust stream nearest the electrodes. In addition to the electrodes, the arc generator includes an energy source coupled to the electrodes and configured to impart enough energy to them such that an arc filament plasma capable of generating the localized perturbation is formed.

Optionally, the electrodes are disposed in the exhaust duct to define a substantially flush fit with the inner (exhaust stream flowpath) surface. As with the previous aspect, the exhaust duct can be substantially axisymmetric or substantially non-axisymmetric. Also as before, the electrodes are arranged around a substantial periphery of the exhaust stream flowpath surface. A controller can be coupled to the arc generator to energize the electrodes according to a predetermined sequence; such an arrangement is beneficial in exciting certain flow instabilities in the exhaust stream. In one form, the energy source is an electric current source capable of delivering high current between adjacent electrodes. At least a portion of the electrodes can be grouped such that a pair (or more) within the group defines an actuator. In a preferred embodiment, the groups of electrodes are formed in pairs. The aforementioned actuators, which can be placed in many duct configurations (including axisymmetric and non-axisymmetric ones) are configured to produce the arc filament plasma that produces the localized perturbation.

According to yet another aspect of the invention, a propulsion system is disclosed. The propulsion system includes a gas generator and an exhaust system in fluid communication with the gas generator. The exhaust system includes an exhaust duct defining an exhaust stream flowpath surface, and an arc generator cooperative with the exhaust duct. When the arc generator is activated while exhaust gas is flowing through the duct, an arc filament plasma is formed that produces a localized perturbation in the exhaust stream. The arc generator includes numerous electrodes disposed adjacent the exhaust duct. As before, the electrodes are placed such that they do not substantially protrude into the exhaust stream. The arrangement of the electrodes permits the localized perturbation to generate streamwise vorticity in the effected portion of the exhaust stream. As previously discussed, an energy source coupled to the electrodes is configured to impart enough energy to them so that an arc filament plasma capable of generating the localized perturbation is formed. Optionally, the gas generator is a gas turbine engine comprising a compressor, a combustor and turbine. In addition, at least a portion of the electrodes can be arranged in groups (such as the aforementioned pairs) such that each group or pair defines an actuator. Two or more of the electrodes can be arranged to be electrically coupled to a common ground electrode. It will be appreciated by those skilled in the art that such a common ground electrode arrangement is equally applicable to the other aspects of the invention disclosed herein.

According to still another aspect of the invention, a method of reducing noise emanating form a flowpath is disclosed. The method includes flowing a fluid along the flowpath and generating an arc filament plasma at one or more locations along the flowpath to produce at least one localized perturbation in a portion of the flowpath, the localized perturbation configured such that upon its production, streamwise vorticity is formed in the portion of the flowpath.

Optionally, the flowpath is defined by a conduit (such as an enclosed duct). To generate an arc filament plasma, the method includes operating an arc generator such that upon activation of the generator, an arc filament is formed that produces the localized perturbation in fluid flowing through the flowpath. In a more specific option, the arc generator includes a plurality of electrodes disposed adjacent the flowpath in an unobtrusive way. In addition, the arc generator includes an energy source coupled to the electrodes and configured to impart enough energy to them such that the arc filament plasma capable of generating the localized perturbation is formed. The method may further comprise arranging the electrodes in the conduit to define a substantially flush fit with the surface of the conduit adjacent the flowpath, as well as arranging them around a substantial periphery of the flowpath. As before, the conduit can be a substantially axisymmetric exhaust duct or a substantially non-axisymmetric exhaust duct. In addition, the arc generator can be operated to energize the electrodes according to a predetermined sequence, frequency or both in order to excite flow instabilities in the flowpath. In one example, the electrodes can be operated to be in phase (simultaneously on or off) with each other, or out of phase with each other. In one form, the energy source is an electric current source. In addition, the electric current source can operate at alternating current frequencies of up to hundreds of kHz, and voltages of up to tens of thousand volts. Moreover, the arc filament plasmas can be used to generate the localized flow perturbations via very rapid heating. For example, by taking as low as a few microseconds to cause the heating of the adjacent fluid, a highly desirable localized accompanying pressure jump is formed to effect the requisite flow perturbation that is otherwise not possible with large surface area, low-temperature, non-equilibrium plasmas. The method of reducing noise may further include exciting jet instabilities within the flowpath by generating the arc filament plasma with predetermined forcing frequencies that match the initial shear layer instabilities or as high as frequencies associated with the flow structures in inertial subrange. For example, the forcing frequency can be from tens of kilohertz (kHz) to hundreds of kHz in a laboratory environment.

According to another aspect of the invention, a method of mixing fluid within a flowpath is disclosed. The method includes flowing fluid through a conduit and operating an arc generator to cooperate with the conduit such that upon activation of the generator during the flow of the fluid through the conduit, an arc filament plasma is formed that produces a localized perturbation in a portion of the fluid stream. The arc generator includes a plurality of electrodes disposed adjacent the portion of the fluid stream being perturbed. As before, the electrodes do not substantially protrude into the fluid stream, and are arranged such that the localized perturbation generates at least one of streamwise vorticity or excitation of flow instabilities in the portion of the adjacent fluid stream. Also as before, an energy source is coupled to the electrodes to impart the energy needed to form the localized perturbation. Optionally, the arc generator can be operated to energize the electrodes according to a predetermined sequence in order to introduce streamwise vorticity and excite flow instabilities in the flowpath.

According to another aspect of the invention, a method of using an arc filament plasma discharge to control the flow of exhaust gas in a propulsion system is disclosed. The method includes flowing fluid through an exhaust duct and operating an arc generator to cooperate with the exhaust duct such that upon activation of the generator during the flow of the exhaust gas through the exhaust duct, an arc filament plasma is formed that produces a localized perturbation in the exhaust gas. The arc generator includes a plurality of electrodes disposed adjacent the portion of the exhaust gas such that the electrodes do not substantially protrude therein, the electrodes arranged such that the localized perturbation can impart substantial streamwise vorticity in the portion of the exhaust gas; and an electric current source coupled to the electrodes and configured to impart enough energy thereto such that an arc filament plasma capable of generating the localized perturbation is formed. As previously discussed, the exhaust duct can be substantially axisymmetric or substantially non-axisymmetric. In addition, the electrodes can be arranged in groups such that each group defines an actuator. In a more particular form of this arrangement, two or more of these electrodes can be electrically coupled to a common ground electrode. In another configuration, each actuator may be made up of a pair of electrodes.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1B:
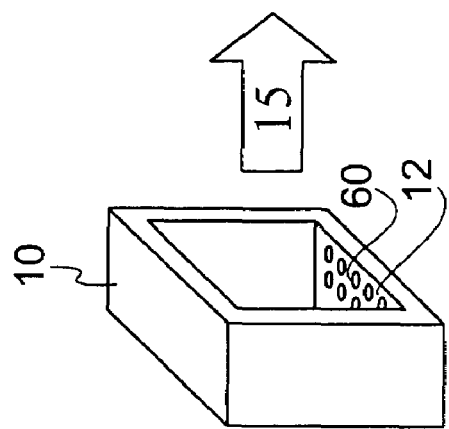
FIG. 1B illustrates a perspective view of an electrode array placed in a rectangular exhaust nozzle.
Figure 1A:
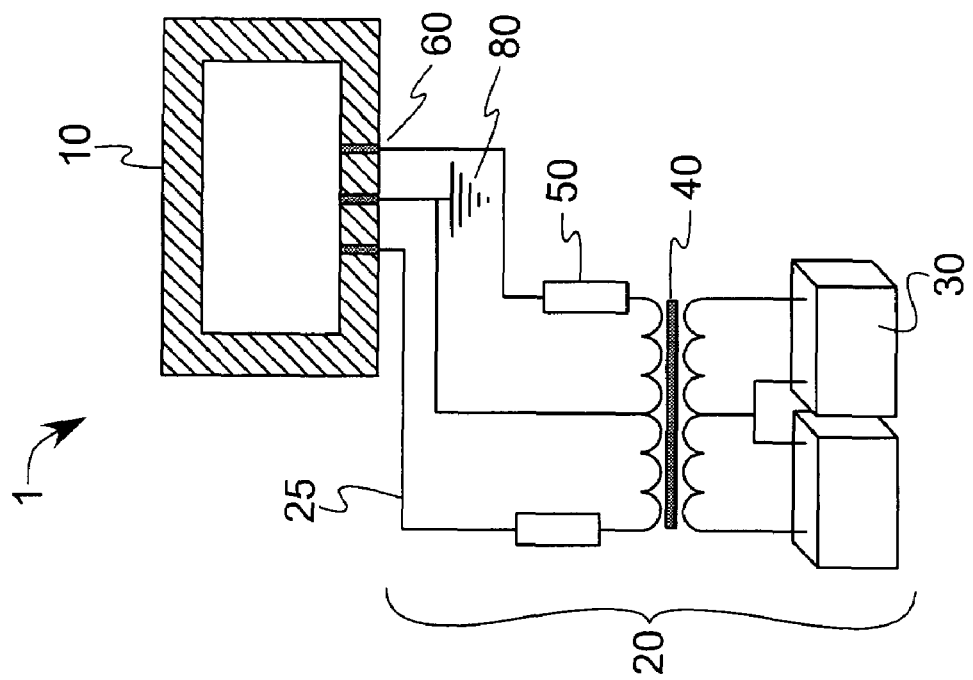
FIG. 1A illustrates a schematic arrangement of a pair of plasma actuators with a common ground electrode according to an aspect of the present invention as placed in a rectangular exhaust nozzle.

Referring first to FIGS. 1A and 1B, a schematic of a localized arc filament flow control system 1 is shown. The system 1 includes a conduit (shown in the form of a rectangular exhaust nozzle extension 10) configured as a fluid flowpath 15, and an arc generator 20. The system 1 includes copper or steel pin electrodes 60 shown embedded into the flowpath surface 12 of exhaust nozzle 10. Electrodes 60 are substantially flush mounted into surface 12 in order to avoid protruding into the flowpath 15. In one embodiment, each electrode 60 is two millimeters in diameter, connected to arc generator 20 through appropriate wiring 25. In a preferred form, each pair of electrodes that are used together to complete a circuit cooperate as an actuator. The actuator can be placed in numerous locations within the exhaust nozzle 10, thus permitting tailoring of the position of the generated arc filament plasma. Additional equipment making up the arc generator 20 include amplifiers 30, transformers 40 and ballast resistors 50. In the embodiment shown, two electrodes 60 share a ground electrode that is electrically coupled to ground 80 to complete the electric circuit that passes through either or both electrodes 60. In a preferred embodiment, the exhaust nozzle 10 is made from a non-conducting refractory material (such as a ceramic or ceramic composite) to best resist the localized high temperature regime produced by the electrodes 60. A cooling system (not shown) can be placed in heat exchange relationship with the exhaust nozzle 10 to keep local surface temperatures below the maximum nozzle operating temperature. The use of cooling air from a compressor bypass or a fan duct to cool exhaust duct liners and nozzle flaps, as used in conventional gas turbine engine exhaust systems, could be employed. The electrodes 60 can be configured as an array of pairs, forming an actuator. Each actuator then can be powered with variable frequency (up to hundreds of kHz) and amplitude. The array could then be tailored to the needs of specific flow regimes, including those for aircraft exhaust systems designed to fly with subsonic and supersonic Mach numbers, including both current civil subsonic and future supersonic aircraft, as well as military aircraft. An additional benefit of the electrodes 60 is that they are equally applicable whether the fluid environment is hot (such as encountered in the exhaust duct of a typical aircraft) or cold.

Referring with particularity to FIG. 1B, the dimensions of the exhaust nozzle 10 of the experimental setup is described as follows. The exit dimensions are one-half inch high by one and one-half inches across, producing an aspect ratio of three. It will be appreciated by those skilled in the art that while the present inventors incorporated an experimental setup with exhaust nozzle 10 that were configured to operate at three discreet Mach numbers, specifically Mach 0.9, 1.3 and 2, that other Mach numbers, nozzle dimensions, aspect ratios and shapes are within the scope of the present invention. The electrodes 60 are formed in rows, where each of the electrodes are four millimeters apart in the spanwise direction, while adjacent rows are spaced six millimeters apart in the streamwise direction. The downstream row of electrodes are spaced four millimeters from the trailing edge of the exhaust nozzle 10. Referring with particularity to FIG. 1A, the configuration of the remainder of the experimental setup is described as follows. The electrodes were powered by a Powertron 3 kilowatt, high-voltage (up to 15 kV root mean square (rms)), variable frequency (2 to 60 kHz) AC power supply, which included the two individually excited amplifiers 30 and two-arm step-up transformer 40. The power supply generated two high-voltage output signals used to generate a pair of either streamwise or spanwise arc filaments in the flowpath of the exhaust nozzle 10. The power supply frequency and the phase shift between the two AC excitation signals could be independently varied. Experiments were conducted in ideally expanded Mach 0.9, 1.3 and 2.0 flows with exhaust nozzle 10 exit static pressure of one atmosphere. Two spanwise arc filaments, lined up in the spanwise direction shown, were generated at the AC voltage frequency of 10 kHz, in phase with each other. Since the arc is initiated twice during each period, in both positive and negative peak voltages, the forcing frequency at these conditions in this specific embodiment is 20 kHz. At all experimental conditions, the arcs were stable and were not blown off by fluid in the flowpath 15 exiting the exhaust nozzle 10. Flow visualization was used to assess the effects of forcing on the fluid (air) flowing through exhaust nozzle 10. While these experiments were carried out using the rectangular nozzle shown at airflow Mach numbers of 0.9, 1.3 and 2.0 under ideally expanded conditions, the electrodes 60 are equally applicable to an axisymmetric exhaust structure, as well as to other flow velocities, as will be shown and discussed later.

Figure 2A:
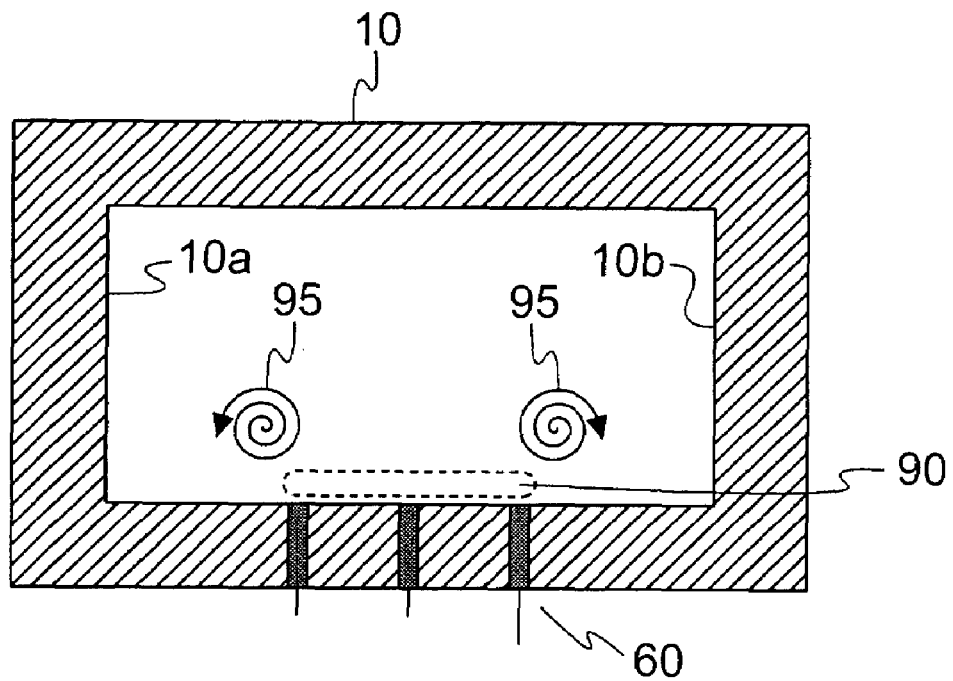
FIG. 2A illustrates an axial view of the formation of streamwise vortices produced by the operation of the electrode arrangement of FIG. 1A.
Figure 2B:
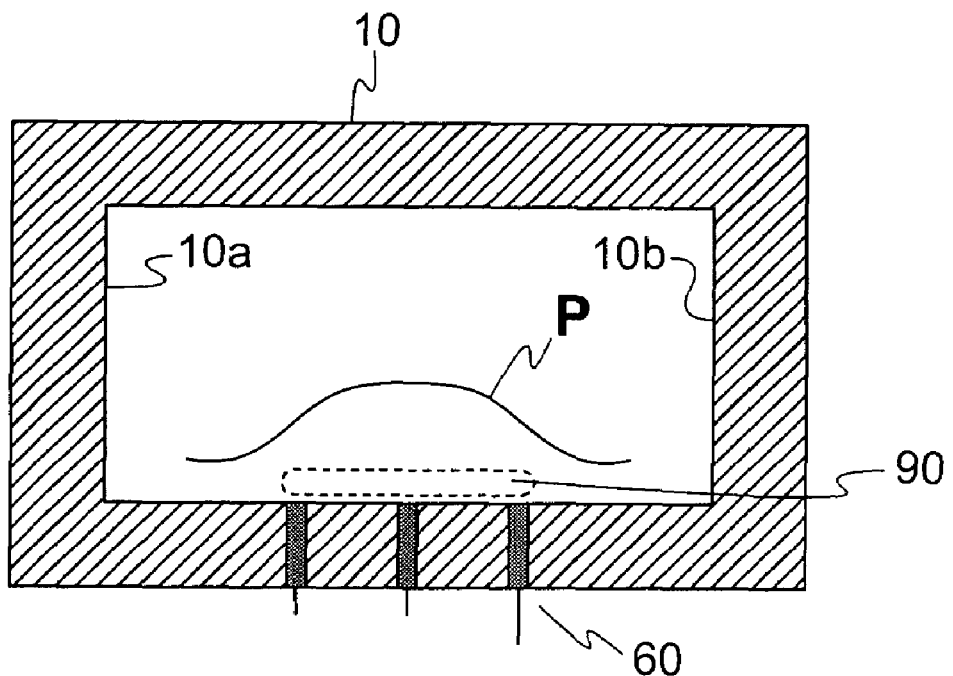
FIG. 2B illustrates an axial view of the formation of a spanwise pressure rise produced by the operation of the electrode arrangement of FIG. 2A.

Referring next to FIGS. 2A and 2B, the effects of the localized perturbations on the formation of streamwise vortices and the induced pressure patterns are shown. When electrodes 60 are energized, the arc filament plasma 90 formed in the region between the electrodes 60 mimics the presence of a physically rigid body placed in the flowpath. This causes a pressure profile P to form upstream of the arc filament plasma 90. This profile P promotes the formation of the pair of localized streamwise vortices 95. Although not shown for an axisymmetric nozzle configuration, it will be appreciated by those skilled in the art that the general principles behind pressure profile buildup and consequent streamwise vorticity formation are similar. The same holds true also for any flow Mach number.

Figure 3:
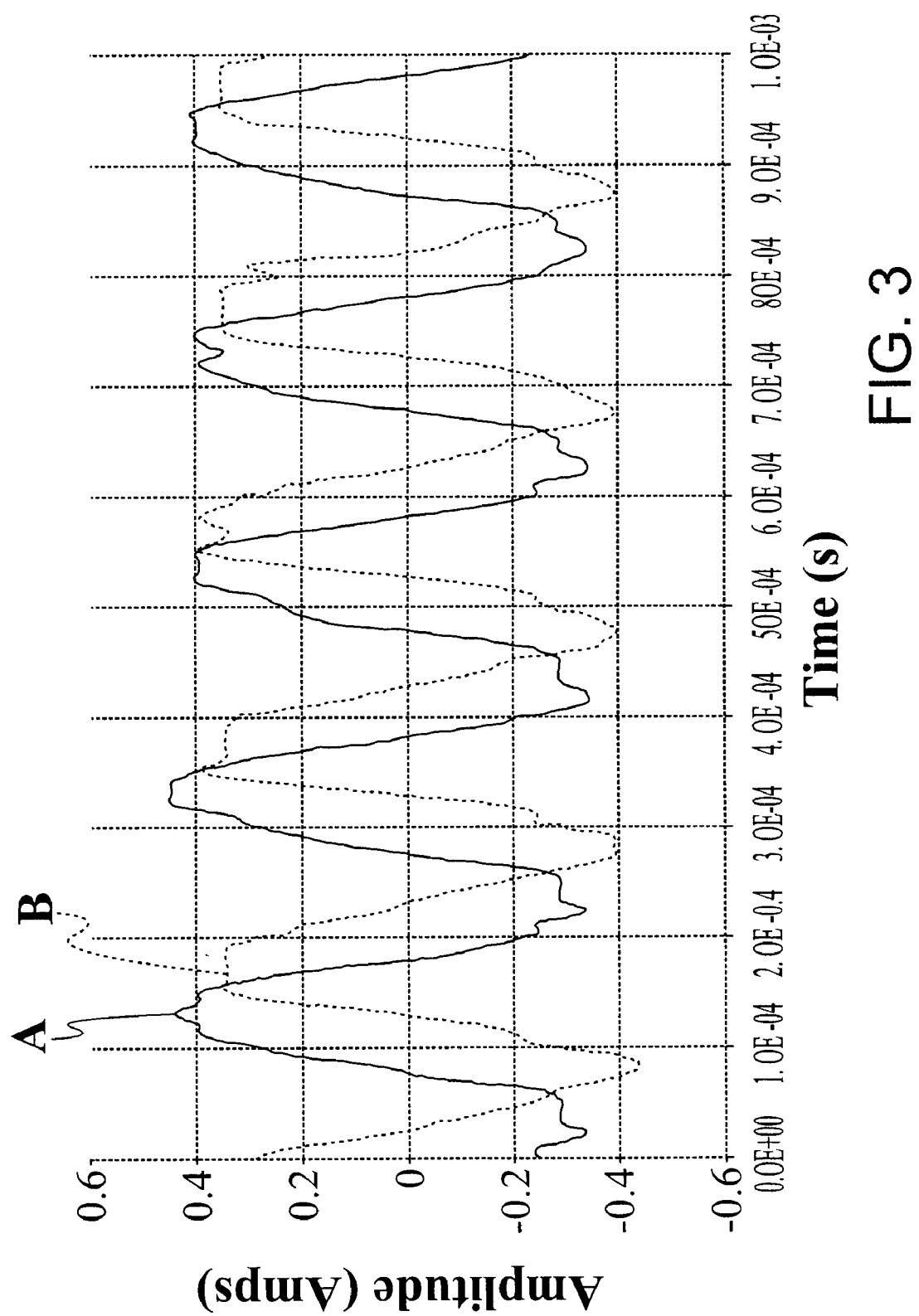
FIG. 3 illustrates current traces of two actuators from the array of FIG. 1B operating out of phase from one another.

Control of excitation frequency, amplitude and duty cycle of the electrode pairs 60, as well as phase shift between adjacent electrode pairs 60 using the variable frequency AC power supply is fairly straightforward. FIG. 3 shows the time-dependent current traces in two arc filaments generated in a Mach 1.3 jet flow when they are operated at the AC voltage frequency of 10 kHz and out of phase with one another. Indeed, it can be seen that the current in filament A reaches maximum (about 0.4 A) when the current in filament B approaches zero (i.e. when the arc is extinguished). This shows that by varying the phase shift between the two AC excitation signals, periodic Joule heat release patterns in multiple filaments can be accurately controlled. It can likewise be seen that the heat release pattern is indeed periodic at a frequency equal to double the input AC voltage frequency in this specific embodiment. Most importantly, the time-averaged power at these conditions is only about 180 Watts, with a substantial fraction of that being dissipated in a 500 ohm ballast resistor connected in series with the electrode gap to stabilize the discharge. The time-averaged power generated in the discharge gap and actually coupled to the flow is only about 50 W per pair of electrodes 60. Comparing this to a kinetic energy flux of the jet of about 22 kW in this laboratory experiment (based on a mass flow rate of 0.3 kilograms per second and flow velocity 380 meters per second) at these conditions reveals that the total plasma power requirement per electrode 60 pair is about 0.8% of the flow power, while the power coupled to the flow by every electrode 60 pair is only about 0.2% of the flow power, thus demonstrating the highly energy efficient nature of the present process. Moreover, this is scalable to high mass flow rate flows. Also, unlike non-equilibrium plasmas, small high-temperature arcs are not subjected to various instabilities, which make possible their use at pressures exceeding one atmosphere.

Figure 4A:
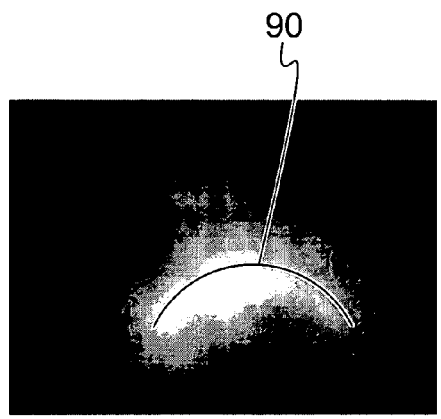
FIG. 4A illustrates a cross section of a jet deformed by the plasma actuators configuration of FIG. 1A.

FIG. 4A shows an average image of an ideally expanded Mach 1.3 rectangular exhaust nozzle with the two plasma actuators of FIG. 1A turned on at forcing frequency of 20 kHz. The image is an average of 25 instantaneous (9 nanosecond exposure time) images obtained using a pulsed Neodymium Yttrium Aluminum Garnet (Nd:YAG) laser operating at a frequency of 10 Hz (the total run time of about 2.5 sec). The laser pulses were not phase-locked with the AC voltage and thus the average is obtained from 25 consecutive instantaneous images. A sheet of spanwise light was passed orthogonal to the exhaust jet centerline along the Y-axis at eight jet heights along the X-axis (where the jet height is one half inch) downstream of the exit. The bright region in the images is the jet mixing layer, where line 90 is shown to track the general shape of the flow deformation induced by the energized electrodes. The bright region in the figure is illuminated via scattering of the laser light by the order of 50 nanometer water particles in the mixing layer. These particles are generated by condensation of moisture in the entrained ambient air when it mixes with the cold and dry jet air. The shape of a nearly rectangular mixing layer is deformed due to the presence of the pair of streamwise vortices (previously shown schematically in FIG. 2A). In addition to the deformation, it can be seen that the scattered light intensity in the lower part of the mixing layer dramatically increases. This implies significant increase of the entrained ambient air into the mixing layer due to streamwise vortices generated by the electrodes. The plasma actuators turn on and off, thereby generating streamwise vortices and causing intermittent deformation in the jet cross section.

Figure 4B:
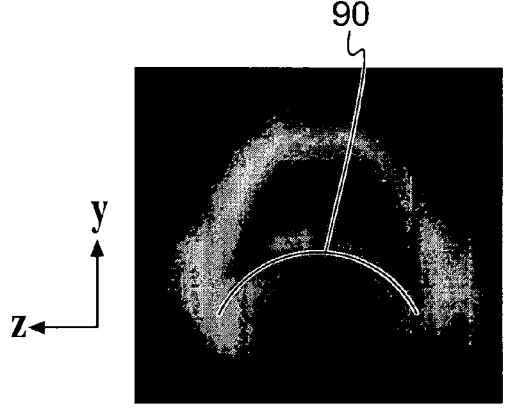
FIG. 4B illustrates a cross section of a jet deformed by a large tab according to the prior art.

FIG. 4B shows a similar behavior of an axisymmetric Mach 1.3 jet cross section when a large tab is placed in the jet flowpath. In contrast to the intermittent vortices formed by the plasma actuators of FIG. 4A, the large tab generates a pair of streamwise vortices continuously, causing concomitant continuous deformation in the jet cross section. The size of the tab is a big factor in the strength of the streamwise vortices and jet deformation.

Figure 5B:
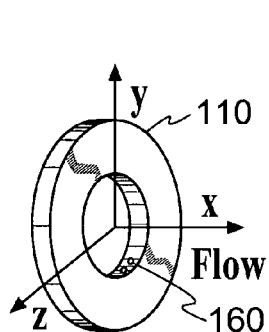
FIG. 5B illustrates a simplified perspective view of the nozzle extension of FIG. 5A.
Figure 5A:
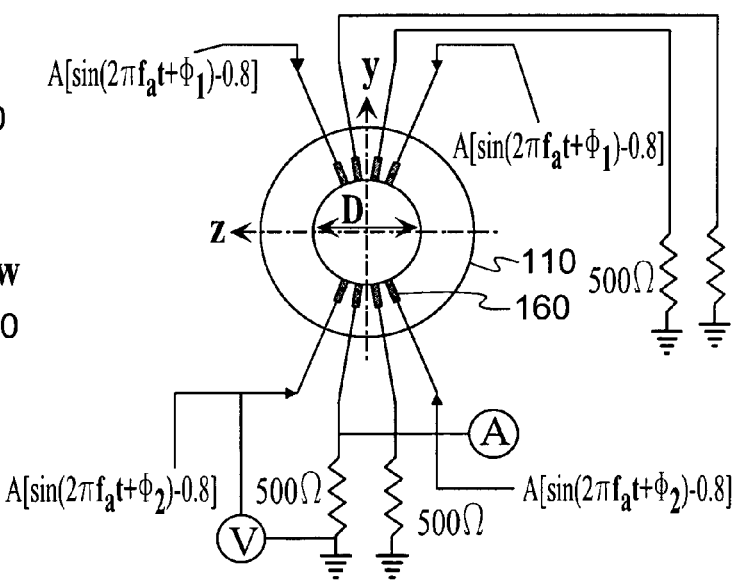
FIG. 5A illustrates four electrode pairs, two on the top and two on the bottom of an axisymmetric exhaust nozzle extension.

Referring next to FIGS. 5A and 5B, in addition to being used for the generation of streamwise vortices, the present electrodes 160 could be used in an axisymmetric exhaust nozzle 110 for excitation of jet instabilities, where four pairs of electrodes 160 are located around portions of the nozzle flowpath. It will be appreciated by those skilled in the art that any jet flow, whether through an axisymmetric or rectangular conduit (or any other shape), has certain inherent instabilities. By providing disturbances with a frequency associated with one of the instabilities in the flow, the disturbances will grow and affect the flow. By keeping the distance between two electrodes very small, or by lining them up in streamwise direction, the generated streamwise vortices can be made very small or virtually eliminated. Turning the electrodes on and off with a preferred frequency will have the effect of exciting a particular jet instability. In the present example, the exit diameter D of the experimental exhaust nozzle 110 (also designed for Mach 0.9, 1.3 or 2.0 flow speeds) was set at one inch. As previously mentioned, the electrodes 160 can be operated either in phase or out of phase with respect to one another. Time resolved pressure measurements with the present configuration revealed an initial jet shear layer instability frequency of about 60 kHz for the baseline jet.

Figure 6A:
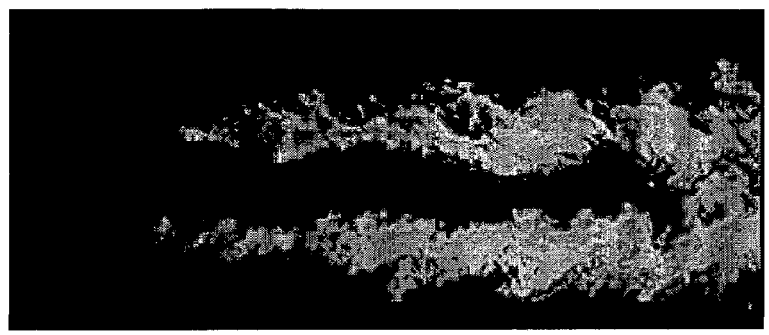
FIGS. 6A and 6B illustrate how the actuators of the present invention can be used to excite jet instabilities in the axisymmetric exhaust nozzle of FIGS. 5A and 5B to organize structures and to increase entrainment and mixing.
Figure 6B:
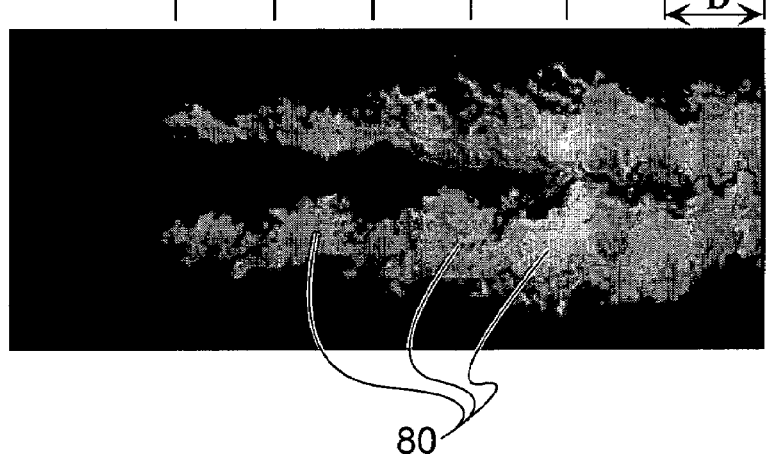

FIGS. 6A and 6B show instantaneous jet streamwise images (approximately 9 nanosecond exposure time) of Mach 1.3 ideally expanded jet for the baseline case of FIG. 6A (where the electrodes are turned off) and for the operating case of FIG. 6B (where all four electrode pairs are energized and operating in-phase and forcing the jet at 10 kHz). The tic marks are one nozzle exit diameter (D) apart, with the first one located at 1D. As can be seen in FIG. 6A, the baseline case has large scale structures that are not organized and are distributed randomly in space. Contrarily, in FIG. 6B exciting the jet instabilities with plasma actuators regulates the structures into spatially quasi-periodic structures, where the wavelength (spacing) of large scale structures is commensurate with the 10 kHz forcing frequency. This forcing frequency is twice the jet column instability frequency, but still within the jet column excitation frequency range. In such an excited state, the entrainment and mixing will increase. As before, only the mixing region is visualized and the intensity of light in the mixing region is directly related to entrainment of the moist ambient air into the jet.

Figure 7A:
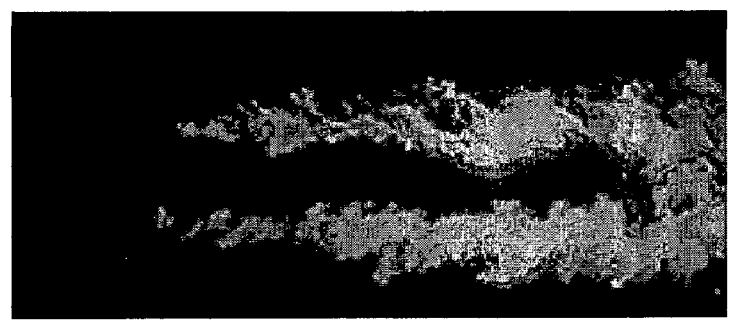
FIGS. 7A and 7B illustrate how the actuators of the present invention can be used to excite jet instabilities in the axisymmetric exhaust nozzle of FIGS. 5A and 5B to reduce entrainment, mixing, and noise.
Figure 7B:
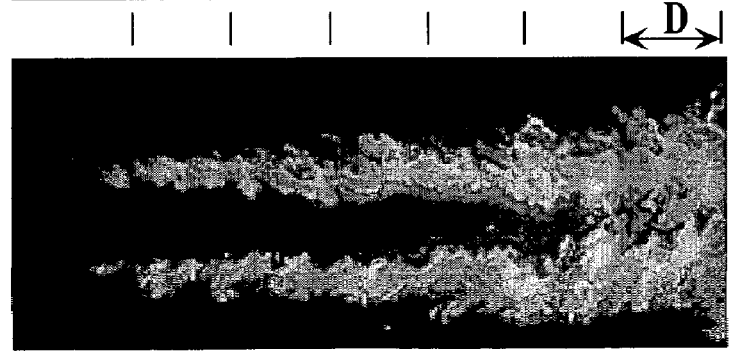

FIGS. 7A and 7B show instantaneous jet streamwise images (approximately 9 nanosecond exposure time) of Mach 1.3 ideally expanded jet for the baseline case of FIG. 7A (where the electrodes are turned off) and for the operating case of FIG. 7B (where all four electrode pairs are energized and operating in-phase and forcing the jet at 60 kHz). As with FIGS. 6A and 6B, the tic marks are one nozzle exit diameter (D) apart, with the first one located at 1D. While FIG. 7A is the same as the image in FIG. 6A, showing the baseline case, FIG. 7B shows an image of the same jet but with much smaller structures and much less entrainment and mixing, due to the higher excitation frequency that is coupled to the flow. This forcing frequency is close to jet initial shear layer instability frequency and would find many applications, especially in relation to jet noise reduction. Since the presence of large scale structures are responsible for a major portion of jet noise, any reduction in the dynamics associated with such structures would produce a concomitant reduction in jet noise.

Figure 8:
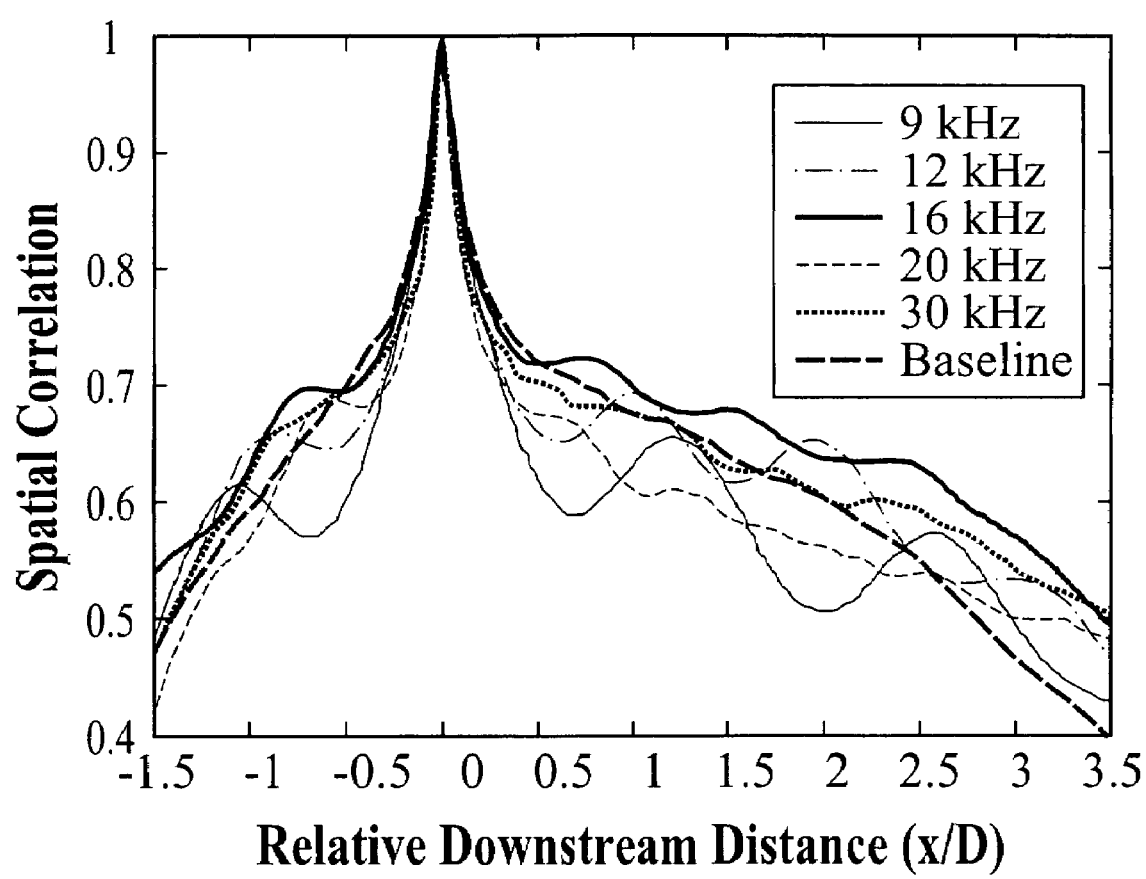
FIG. 8 illustrates spatial correlation of images similar to those of FIGS. 6A, 6B, 7A and 7B, and how excitation of the instabilities via the actuators is coupled into the flow.

If the convective velocity and the spacing (or the wavelength) of large-scale structures shown in the images of FIGS. 6A, 6B, 7A and 7B are determined, one can then obtain approximate shedding frequencies of these structures and thus the response of the jet to forcing. The spacing between the structures can be determined manually from the images, or could be obtained using spatial-correlation of the images. Referring next to FIG. 8, the average spatial correlation over 50 instantaneous streamwise images similar to those in FIGS. 6 and 7 is shown. Spatial correlation is a statistical technique which shows quantitatively how well organized or how random the large scale turbulence structures in a given flow is. If there is no organization of structures, then the peak correlation level of 1 at zero x/D separation in FIG. 8 will continuously drop as the separation is increased. This is typical of the baseline case with actuators off. If structures are well organized, then following 1 at zero x/D, the correlation will decrease with x/D, but will go through local peaks and valleys, as is the case for example for actuators operating at 9 kHz. The distance between two peaks or valleys is directly related to the forcing frequency. These results are consistent with the flow visualization results shown in FIGS. 7A and 7B.

The distance between the local maxima in FIG. 8 is equivalent to the spatial wavelength (or the spacing) of the periodic structures. This wavelength can be used along with the convective velocity of the structures to determine the shedding frequency of the structures. The average convective velocity for this jet was measured at 266 meters per second. The measured average convective velocity was used along with the spatial wavelength determined from FIG. 8 to estimate the shedding frequency of the structures in the forced jet. It is clear from the results that the jet responds to the plasma actuator forcing, where robust quasi-periodic structures develop with strong spatial correlations at lower forcing frequencies, and much smaller and less robust structures at higher forcing frequencies. Accordingly, the actuators have wide bandwidth and strong authority to force the jet at any of its instabilities and affect the jet in any desired fashion.

Figure 9:
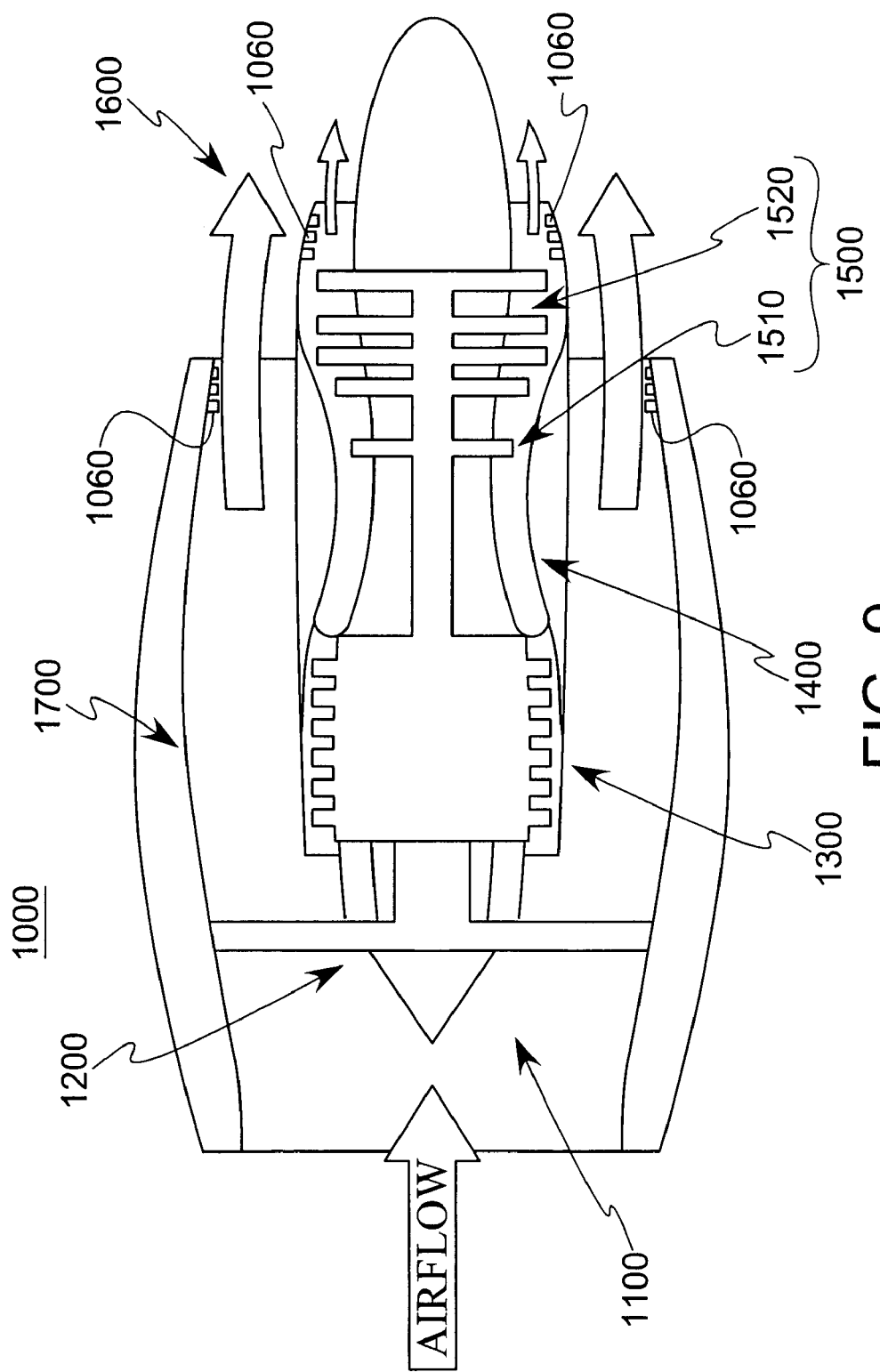
FIG. 9 illustrates a turbofan engine into which electrodes according to the present invention are notionally placed.

Referring next to FIG. 9, a simplified schematic of a turbofan engine used to power an aircraft is shown. The engine 1000 includes an inlet 1100, fan 1200, compressor 1300, combustor 1400, turbine 1500 (typically including a high pressure turbine 1510 and a low pressure turbine 1520) and exhaust nozzle 1600. Cowling 1700 is used to shroud most of the engine 1000, while the fraction of the air passes through the core (the latter of which is made up of the aforementioned compressor 1300, combustor 1400, turbine 1500 and exhaust nozzle 1600) with the remainder bypassed through the fan 1200 between the core and the cowling 1700. The air exiting the exhaust nozzle 1600 generate two mixing regions, where noise is generated, one between the core flow and the fan flow and another between the fan flow and the ambient air. Electrodes 1060 according of the present invention would be placed in the ducting that makes up the exhaust nozzle 1600. A representative placement of the electrodes 1060 in the core and fan flow (without the remainder of the flow control system) is shown along the outer wall of the flowpath of the core nozzle and the fan nozzle, respectively, of the exhaust nozzle 1600. Cooling air for portions of exhaust nozzle 1600 situated adjacent electrodes 1060 could be provided by bleeding off portions of air produced by compressor 1300 or bypass air produced by fan 1200.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. An exhaust system comprising:
   an exhaust duct defining an exhaust stream flowpath surface therein; and
   an arc generator cooperative with said exhaust duct such that upon activation of said arc generator during the flow of an exhaust stream, arc filament plasma is formed that produces a localized perturbation in a portion of said exhaust stream, said arc generator comprising:
   an energy source; and
   a plurality of electrodes coupled to said energy source, said electrodes disposed adjacent a trailing edge of said exhaust duct and configured such that said electrodes do not substantially protrude into said exhaust stream, said electrodes arranged such that said localized perturbation generates streamwise vorticity in said portion of said exhaust stream, such that said electrodes generate localized perturbations that are within the range of the exhaust jet instability frequencies.

2. The exhaust system of claim 1, wherein said electrodes are configured in at least one circumferential row about said exhaust duct.

3. The exhaust system of claim 1, wherein at least a portion of said exhaust stream flowpath surface is comprised of a refractory material.

4. The exhaust system of claim 3, wherein said refractory material comprises at least one of a ceramic or a ceramic composite.

5. The exhaust system of claim 1, further comprising a coolant supply placed in heat exchange relationship with said duct.

6. The exhaust system of claim 1, wherein said electrodes are disposed in said exhaust duct to define a substantially flush fit with said exhaust stream flowpath surface.

7. The exhaust system of claim 6, wherein said electrodes are configured in a plurality of rows such that each successive row is axially downstream in said exhaust duct relative to its immediately preceding row.

8. The exhaust system of claim 1, wherein said exhaust duct is substantially axisymmetric.

9. The exhaust system of claim 1, wherein said exhaust duct is substantially non-axisymmetric.

10. The exhaust system of claim 9, wherein said substantially non-axisymmetric duct is rectangular.

11. The exhaust system of claim 1, wherein said electrodes are arranged around a substantial periphery of said exhaust stream flowpath surface.

12. The exhaust system of claim 11, further comprising a controller coupled to said arc generator, said controller configured to energize said electrodes according to a predetermined frequency and sequence in order to excite at least one flow instability in said exhaust stream.

13. The exhaust system of claim 12, wherein said generation of said localized perturbations at said electrodes occurs staggered time intervals to excite azimuthal modes of the exhaust system.

14. The exhaust system of claim 12, wherein said generation of said localized perturbations at said electrodes occurs simultaneously to excite axisymmetric mode of the exhaust system.

15. The exhaust system of claim 1, wherein at least a portion of said electrodes are grouped such that each group defines an actuator, said actuator configured to produce said arc filament plasma that produces said localized perturbation.

16. The exhaust system of claim 15, wherein said each group comprises a group of two of said electrodes.

17. The exhaust system of claim 1, wherein said energy source is an electric current source.

18. The exhaust system of claim 1, further comprising, a gas generator configured to supply said exhaust system with said exhaust stream.

19. The exhaust system of claim 18, wherein said gas generator is a gas turbine engine comprising:

a compressor or compressors;

a combustor or combustors in fluid communication with said compressor; and a turbine or turbines fluidly disposed between said combustor and said exhaust system, said turbine rotationally cooperative with said compressor.

20. The exhaust system of claim 18, wherein a plurality of said electrodes are electrically coupled to a common ground electrode.

21. The exhaust system of claim 1, wherein said exhaust duct further comprises a core exhaust duct with at least one of said arc generator disposed therein, and a bypass exhaust duct disposed concentrically around said core exhaust duct, said bypass exhaust duct with at least another of said arc generator disposed therein, each of said one and another arc generators configured to selectively operate to produce said localized perturbation within a respective one of said ducts.

* * * * *